United States Patent
Mallya et al.

(10) Patent No.: US 7,551,635 B2
(45) Date of Patent: *Jun. 23, 2009

(54) SONET METHOD AND SYSTEM HAVING NETWORK SERVICE ACCESS POINT ADDRESSING

(75) Inventors: Arvind R. Mallya, Walnut Creek, CA (US); Amit Rele, San Jose, CA (US); Rodney Bruner, Santa Rose, CA (US)

(73) Assignee: SBC Knowledge Ventures, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/246,678

(22) Filed: Oct. 7, 2008

(65) Prior Publication Data

US 2009/0034984 A1 Feb. 5, 2009

Related U.S. Application Data

(63) Continuation of application No. 10/981,824, filed on Nov. 5, 2004, now Pat. No. 7,433,362.

(51) Int. Cl.
*H04L 12/56* (2006.01)
(52) U.S. Cl. ......................... 370/408; 370/219; 370/471
(58) Field of Classification Search ................. 370/408, 370/219, 471, 238, 907, 389
See application file for complete search history.

(56) References Cited

U.S. PATENT DOCUMENTS

| | | | |
|---|---|---|---|
| 5,303,235 A | 4/1994 | Chan et al. | |
| 5,491,692 A | 2/1996 | Gunner et al. | |
| 5,600,637 A | 2/1997 | Kikuta | |
| 5,740,075 A | 4/1998 | Bigham et al. | |
| 6,078,575 A | 6/2000 | Dommety et al. | |
| 6,385,193 B1 | 5/2002 | Civanlar et al. | |
| 6,490,292 B1 | 12/2002 | Matsuzawa | |
| 6,493,340 B1 | 12/2002 | Kawanaka | |
| 6,618,377 B1 | 9/2003 | Miriyala | |
| 6,738,828 B1 | 5/2004 | Keats et al. | |
| 7,039,014 B1 | 5/2006 | Krishnamurthy et al. | |
| 7,046,669 B1 | 5/2006 | Mauger et al. | |
| 2002/0112077 A1 | 8/2002 | Semaan et al. | |
| 2003/0070007 A1 | 4/2003 | Tchakmakjian | |
| 2004/0230696 A1* | 11/2004 | Barach et al. | 709/238 |

(Continued)

OTHER PUBLICATIONS

Information Technology—Open Systems Interconnection—Network service definition; International Standard; ISO/IEC 8348 Nov. 1, 2002; Switzerland.

*Primary Examiner*—Brian D Nguyen
(74) *Attorney, Agent, or Firm*—Brooks Kushman P.C.

(57) ABSTRACT

A synchronous optical network (SONET) system having multi-hierarchal network service access point (NSAP) addressing includes electrically linked network elements (NEs) and first and second level routing areas which each include at least one NE. The NEs include devices having respective NSAP addresses and at least one of the NEs is a network controller that controls the SONET. The first level routing area and the second level routing areas are based on a predetermined prioritization of the NEs as first level NEs and second level NEs, and have a first level routing and having a second level routing for the NSAP addresses, respectively. Each NSAP address includes a Routing Domain field and an Area field filled with information indicative of a respective Internet Protocol (IP) address.

14 Claims, 3 Drawing Sheets

U.S. PATENT DOCUMENTS

| | | | |
|---|---|---|---|
| 2005/0068950 A1* | 3/2005 | Ellis et al. | 370/389 |
| 2005/0175341 A1* | 8/2005 | Ovadia | 398/43 |
| 2005/0238009 A1* | 10/2005 | Bell | 370/389 |
| 2006/0075123 A1* | 4/2006 | Burr et al. | 709/228 |

* cited by examiner

|  | IDP (Including Pad) | | | DSP | | | | | |
|---|---|---|---|---|---|---|---|---|---|
| FIELD NAME | AFI | IDI | IDI PAD | DFI | ORG | RES | RD | AREA | SYSTEM | SEL |
| NUMBER of OCTETS | 1 | 1 1/2 | 1/2 | 1 | 3 | 2 | 2 | 2 | 6 | 1 |

IDP: Initial Domain Part
DSP: Domain Specific Part
AFI: Authority and Format Identifier
IDI: Initial Domain Identifier
DFI: DSP Format Identifier
ORG: Organization Identifier
RES: Reserved
RD: Routing Domain
AREA: Identifier for a Routing Area within a Routing Domain
SYSTEM: Routing Entity Identifier for Routing Entity within an NE or OS
SEL: NSAP Selector

FIG. 1

|  | AFI | IDI | IDI PAD | DFI | ORG Id | RES | RDI | AREA | SYSTEM | SEL |
|---|---|---|---|---|---|---|---|---|---|---|
| # Bytes | 1 | 1 1/2 | 1/2 | 1 | 3 | 2 | 2 | 2 | 6 | 1 |
| Value in Decimal | 57 | 2112 | 15 | 128 | 1128256 | 0 | See below- Fig. 3b | See below- Fig. 3b | Mac of Interface | 0 or 1 |
| Value in Hex | 0x39 | 0x840 | 0xf | 0x80 | 0x113740 | 0x0000 | Section 4.1 of Sonet Standard | Section 4.1 of Sonet Standard | Mac of Interface | 0 or 1 |

FIG. 3a

| RDI / Area Field | Byte | Address Byte Location |
|---|---|---|
| RDI | 1 | First Octet of IP Address |
| RDI | 2 | Second Octet of IP Address |
| Area | 1 | Third Octet of IP Address |
| Area | 2 | Fourth Octet of IP Address |

Sonet Standard

FIG. 3b

| Field Name | Field Description | Size (Bytes) | Value | Definition |
|---|---|---|---|---|
| AFI | Authority and Format Identifier | 1 | 0x39 | Identifies the sub-domain as DCC 840. Specifies the syntax of the DSP as binary octets. |
| IDI | Initial Domain Identifier | 2 | 0x8 40F | Indicates that the sub-domain is DCC 840. |
| DFI | Domain Format Identifier | 1 | 0x80 | Indicates the SONET DSP format. |
| ORG | Organization Identifier | 3 | 0x1 13740, for example | Specifies the network within the DCC 840 sub-domain, where the NSAP resides, and the authority responsible for organizing the network into routing domains and areas. |
| RSVD | Reserved | 2 | 0 | Indicates that the field is reserved. |
| RDI | Routing Domain Identifier | 2 | Variable | Identifies the routing domain where the NSAP resides (assigned by the authority identified in the ORG field). |
| Area | Area Identifier | 2 | Variable | Specifies the local area where the NSAP resides (assigned by either the authority identified in the ORG field or the local administrative authority that the ORG authority has delegated to this routing domain). |
| ID | System Identifier | 6 | Variable | Identifies the system where the NSAP resides specified by the systems MAC address. |
| S | NSAP Selector | 1 | 0 or 1 | Selects the transport layer entity the system uses. This entity is specified in the ID field. |

FIG. 2

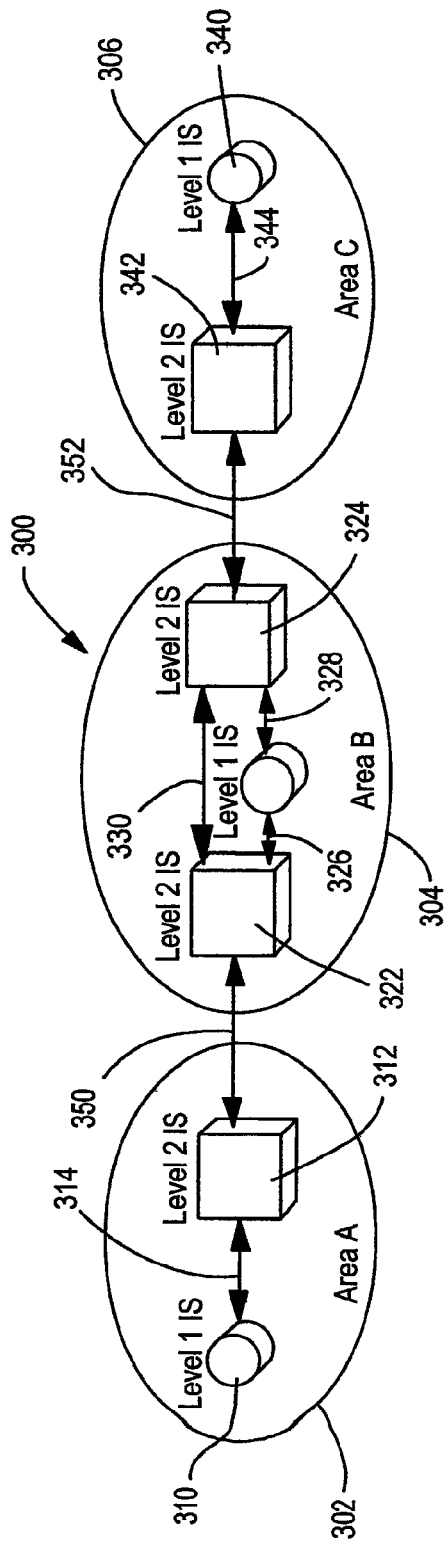

SONET METHOD AND SYSTEM HAVING NETWORK SERVICE ACCESS POINT ADDRESSING

CROSS-REFERENCE TO RELATED APPLICATIONS

This application is a continuation of U.S. application Ser. No. 10/981,824, filed Nov. 5, 2004, now U.S. Pat. No. 7,433,362 issued on Oct. 7, 2008, which is hereby incorporated by reference in its entirety.

BACKGROUND OF THE DISCLOSURE

1. Field of the Disclosure

The present disclosure relates to a system and a method for synchronous optical network (SONET) network service access point (NSAP) addressing.

2. Background Art

Conventional synchronous optical network (SONET) equipment uses two types of addresses to communicate with respective neighbors (i.e., respective network elements in an assigned area), a Transport Identifier (TID) and a Network Service Access Point (NSAP). The TID is a user-friendly name (40 character string) that is assigned to each respective network element (NE), similar to a domain name server (DNS) name. A TID has no inherent uniqueness or hierarchy. The NSAP is a 20 Byte field, broken down into categories as defined in ISO/IEC 8348:2002(E).

Referring to FIG. 1, a diagram illustrating the categories of an NSAP 10 is shown. NSAP 10 includes of two distinct portions: an Initial Domain Portion or Part (IDP) 20 and a Domain Specific Portion (DSP) 30. IDP 20 is a three Byte field that includes an Authority and Format Identifier (AFI) and an Initial Domain Identifier (IDI).

The AFI identifies the IDI format and the DSP syntax. For SONET, the value of the AFI is 39 (decimal), which identifies the ISO DCC (Data Country Code) as the address format and preferred binary encoding for DSP 30. The ISO DCC is a three-digit numeric code allocated according to ISO 3166. The IDI portion of IDP 20 has the value of 840 (decimal) for the United States. The IDI Pad portion of IDP 20 is required to make the IDI and integral number of bytes, and is always equal to 1111 (decimal).

Referring to FIG. 2, a diagram illustrating an alternative description of NSAP 10 is shown. Example values of the octets and definitions for respective fields are shown.

The NSAP address is a larger address than the TID, and the NSAP address confers hierarchy and global uniqueness to each NE, similar to an Internet protocol (IP) address and a media access control (MAC) address. An NSAP is used to securely route management traffic through a respective network. An NSAP includes two parts, the area part and an equipment specific part. One example of conventional equipment includes a default area address. The default area address is not changed when the equipment is placed into service. The equipment specific part includes a unique MAC address. As a result, all of the equipment that is connected is implemented in a single area, and a single area can only operate with up to a maximum of 150 addresses. As such, a 151st element cannot be managed in a single area. As additional equipment is installed, the deficiency caused by the limit of 150 MAC addresses in a single area is increasingly more frequently encountered.

Target Identifier Address Resolution Protocol (TARP) is used to correlate between the two types of addresses. For example, when a network is implemented having two NEs with respective TIDs (e.g., NE1 and NE2), the TID for NE2 is known to NE1. However, the NSAP for NE2 is not known to NE1. When a communication is to be performed between NE1 with NE2, NE1 broadcasts a TARP request to obtain the NSAP for NE2. When the NE2 receives the TARP request, the NE2 returns a message to the NE1 including the NSAP and the TID for NE2. The NE1 can subsequently communicate directly with the NE2.

One conventional approach used on the SONET Data Country Code (SDCC) overhead has a basic address limitation of 50 addresses by definition. The limit has been extended to 150 addresses by many but not all SONET equipment vendors. The limit restricts the number of network elements that can be connected in a level one routing area. The lowest address restriction on a network element type determines the maximum number of addresses for a routing area. In the conventional approaches where the limit remains at 50 addresses, the limit restriction reduces to 50 the routing areas addresses for all elements in the respective routing area.

In another conventional approach, the address restrictions have been accommodated by keeping routing areas physically small. The routing areas are kept physically small by limiting the number of rings that are controlled by an operations controller, turning off unneeded SDCC channels, and avoiding unnecessary C-net connections. However, keeping routing areas physically small requires considerable effort reconfiguring the management network. As the number of DCC channels on a network element have increased, keeping routing areas physically small is losing effectiveness.

In yet another conventional approach, multiple rings at one or more nodes are connected in a chain/mesh configuration, which rapidly increases the number of nodes in a routing area. However, conventional methods of controlling routing area size are inadequate to sustain management of routing area requirements.

Thus, there exists a need for an improved system and an improved method for synchronous optical network (SONET) network service access point (NSAP) addressing. Such an improved system and an improved method may address some or all of the problems and deficiencies of conventional approaches identified above, and provide additional features and advantages as discussed below.

BRIEF DESCRIPTION OF THE DRAWINGS

The present disclosure is pointed out with particularity in the appended claims. However, other features of the present disclosure will become more apparent, and the present disclosure will be best understood by referring to the following detailed description in conjunction with the accompanying drawings in which:

FIG. 1 illustrates categories of a Network Service Access Point (NSAP);

FIG. 2 illustrates an alternative description of categories of a NSAP;

FIGS. 3a and 3b illustrate NSAP addressing according to the present disclosure;

FIG. 4 illustrates an example description of categories of a NSAP addressing according to the present disclosure; and FIG. 5 illustrates a system where the NSAP addressing of the present disclosure may be implemented.

DETAILED DESCRIPTION OF THE PREFERRED EMBODIMENT(S)

The present disclosure generally provides new, improved and innovative techniques for synchronous optical network (SONET) Network Service Access Point (NSAP) addressing. The system and method of the present disclosure generally provide for subdividing and reassigning the existing NASP address Organization, Routing Domain Identifier, and Area fields into sub-Areas by changing the NSAP Area addresses and providing a hierarchical addressing scheme.

In the description below, the abbreviations, acronyms, terms, etc. may be defined as follows:

ANSI: American National Standards Institute. Founded in 1918, ANSI is a voluntary organization composed of over 1,300 members (including all the large computer companies) that creates standards for the computer industry. In addition to programming languages, ANSI sets standards for a wide range of technical areas, from electrical specifications to communications protocols. For example, FDDI, the main set of protocols for sending data over fiber optic cables, is an ANSI standard. SONET (see below) is also an ANSI standard.

ATM: Asynchronous Transfer Mode. ATM is a network technology based on transferring data in cells or packets of a fixed size. The cell used with ATM is relatively small compared to units used with older technologies. The small, constant cell size allows ATM equipment to transmit video, audio, and computer data over the same network, and assure that no single type of data hogs the line. ATM is a dedicated-connection switching technology that organizes digital data into predetermine byte-size cell units and transmits the cell units over a physical medium using digital signal technology. Individually, cells are processed asynchronously relative to other related cells and are queued before being multiplexed over the transmission path.

Backup: A reserve, substitute, extra, standby, or other resource for use in the event of failure or loss of the original (or primary) resource.

CO: Central Office. In telephony, a CO is a telecommunications office centralized in a specific locality to handle the telephone service for that locality. Telephone lines are connected to the CO on a local loop. The CO switches calls between local service and long-distance service. ISDN and DSL signals also channel through the CO.

DCC: Data Country Code

DNS: Domain Name System (or Service or Server). DNS is an Internet service that translates domain names into IP addresses. Because domain names are alphabetic, they're easier to remember. The Internet however, is really based on IP addresses. Every time a domain name is used, therefore, a DNS service must translate the name into the corresponding IP address. For example, the domain name www.example.com might translate to 198.105.232.4. The DNS system is, in fact, its own network. If one DNS server doesn't know how to translate a particular domain name, it asks another one, and so on, until the correct IP address is returned.

DSL or xDSL: Refers collectively to all types of digital subscriber lines, the two main categories being ADSL and SDSL. Two other types of xDSL technologies are High-data-rate DSL (HDSL) and Very high DSL (VDSL). DSL technologies use sophisticated modulation schemes to pack data onto copper wires. They are sometimes referred to as last-mile technologies because they are used only for connections from a telephone switching station to a home or office, not between switching stations. xDSL is similar to ISDN inasmuch as both operate over existing copper telephone lines (POTS) and both require the short runs to a central telephone office (usually less than 20,000 feet). However, xDSL offers much higher speeds—up to 32 Mbps for upstream traffic, and from 32 Kbps to over 1 Mbps for downstream traffic.

EMS: Enhanced Message Service, an application-level extension to SMS for cellular phones available on GSM, TDMA and CDMA networks. Where GSM is an abbreviation for Global System for Mobile Communications, one of the leading digital cellular systems. GSM uses narrowband TDMA, which allows eight simultaneous calls on the same radio frequency. TDMA is Time Division Multiple Access, a technology for delivering digital wireless service using time-division multiplexing (TDM). TDMA works by dividing a radio frequency into time slots and then allocating slots to multiple cells. In this way, a single frequency can support multiple, simultaneous data channels. TDMA is used by the GSM digital cellular system. CDMA is Code-Division Multiple Access, a digital cellular technology that uses spread-spectrum techniques. Unlike competing systems, such as GSM, that use TDMA, CDMA does not assign a specific frequency to each user. Instead, every channel uses the full available spectrum. Individual conversations are encoded with a pseudo-random digital sequence.

Gateway: A node on a network that serves as an entrance to another network. In enterprises, the gateway is the computer that routes the traffic from a workstation to the outside network that is serving the Web pages. In homes, the gateway is the ISP that connects the user to the internet. In enterprises, the gateway node often acts as a proxy server and a firewall. The gateway is also associated with both a router, which use headers and forwarding tables to determine where packets are sent, and a switch, which provides the actual path for the packet in and out of the gateway.

IP: Internet Protocol. IP specifies the format of packets, also called datagrams, and the addressing scheme. Most networks combine IP with a higher-level protocol called Transmission Control Protocol (TCP), which establishes a virtual connection between a destination and a source. IP by itself is something like the postal system. It allows you to address a package and drop it in the system, but there's no direct link between you and the recipient. TCP/IP, on the other hand, establishes a connection between two hosts so that they can send messages back and forth for a period of time.

MAC address: Media Access Control address. A MAC address is a hardware address that uniquely identifies each node of a network. In IEEE 802 networks, the Data Link Control (DLC) layer of the OSI Reference Model is divided into two sublayers: the Logical Link Control (LLC) layer and the Media Access Control (MAC) layer. The MAC layer interfaces directly with the network medium. Consequently, each different type of network medium requires a different MAC layer. On networks that do not conform to the IEEE 802 standards but do conform to the OSI Reference Model, the node address is called the Data Link Control (DLC) address.

ISDN: Integrated Services Digital Network, an international communications standard for sending voice, video, and data over digital telephone lines or normal telephone wires. ISDN supports data transfer rates of 64 Kbps (64,000 bits per second). There are two types of ISDN: Basic Rate Interface (BRI)—consists of two 64-Kbps B-channels and one D-channel for transmitting control information. Primary Rate Interface (PRI)—consists of 23 B-channels and one D-channel (U.S.) or 30 B-channels and one D-channel (Europe). The original version of ISDN employs baseband transmission. Another version, called B-ISDN, uses broadband transmission and is able to support transmission rates of 1.5 Mbps. B-ISDN requires fiber optic cables and is not widely available.

IT: Information Technology, the broad subject concerned with all aspects of managing and processing information, especially within a large organization or company. Because computers are central to information management, computer departments within companies and universities are often called IT departments. Some companies refer to this department as IS (Information Services) or MIS (Management Information Services).

Network: A group of two or more computer systems linked together. There are many types of computer networks, including:

local-area networks (LANs): The computers are geographically close together (that is, in the same building).

wide-area networks (WANs): The computers are farther apart and are connected by telephone lines or radio waves.

campus-area networks (CANs): The computers are within a limited geographic area, such as a campus or military base.

metropolitan-area networks MANs): A data network designed for a town or city.

home-area networks (HANs): A network contained within a user's home that connects a person's digital devices.

In addition to these types, the following characteristics are also used to categorize different types of networks:

topology: The geometric arrangement of a computer system. Common topologies include a bus, star, and ring. See the Network topology diagrams in the Quick Reference section of Webopedia.

protocol: The protocol defines a common set of rules and signals that computers on the network use to communicate. One of the most popular protocols for LANs is called Ethernet. Another popular LAN protocol for PCs is the IBM token-ring network.

architecture: Networks can be broadly classified as using either a peer-to-peer or client/server architecture. Computers on a network are sometimes called nodes. Computers and devices that allocate resources for a network are called servers NSAP: Network Service Access Point OSI: Open System Interconnection. A networking framework for implementing protocols defined by a seven (7) layer model. Control is passed from one layer to the next, starting at the application layer in one station, proceeding to the bottom layer, over the channel to the next station and back up the hierarchy.

Application Layer (Layer 7): This layer (Layer 7) supports application and end-user processes. Communication partners are identified, quality of service is identified, user authentication and privacy are considered, and any constraints on data syntax are identified. Everything at layer 7 is application-specific. Layer 7 provides application services for file transfers, e-mail, and other network software services. Telnet and FTP are applications that exist entirely in the application level. Tiered application architectures are part of this layer (Layer 7).

Presentation Layer (Layer 6): This layer (Layer 6) provides independence from differences in data representation (e.g., encryption) by translating from application to network format, and vice versa. The presentation layer (Layer 6) works to transform data into the form that the application layer can accept. Layer 6 formats and encrypts data to be sent across a network, providing freedom from compatibility problems. Layer 6 is sometimes called the syntax layer.

Session Layer (Layer 5): This layer (Layer 5) establishes, manages and terminates connections between applications. The session layer sets up, coordinates, and terminates conversations, exchanges, and dialogues between the applications at each end. Layer 5 deals with session and connection coordination.

Transport Layer (Layer 4): This layer (Layer 4) provides transparent transfer of data between end systems, or hosts, and is responsible for end-to-end error recovery and flow control. Layer 4 ensures complete data transfer.

Network Layer (Layer 3): This layer (Layer 3) provides switching and routing technologies, creating logical paths, known as virtual circuits, for transmitting data from node to node. Routing and forwarding are functions of layer 3, as well as addressing, internetworking, error handling, congestion control and packet sequencing.

Data Link Layer (Layer 2): At this layer (Layer 2), data packets are encoded and decoded into bits. Layer 2 furnishes transmission protocol knowledge and management and handles errors in the physical layer, flow control and frame synchronization. The data link layer (Layer 2) is divided into two sublayers: The Media Access Control (MAC) layer and the Logical Link Control (LLC) layer. The MAC sublayer controls how a computer on the network gains access to the data and permission to transmit it. The LLC layer controls frame synchronization, flow control and error checking.

Physical Layer (Layer 1): This layer (Layer 1) conveys the bit stream—electrical impulse, light or radio signal—through the network at the electrical and mechanical level. Layer 1 provides the hardware means of sending and receiving data on a carrier, including defining cables, cards and physical aspects. Fast Ethernet, RS232, and ATM are protocols with physical layer components.

OSS: Operational Support System, a generic term for a suite of programs that enable an enterprise to monitor, analyze and manage a network system. The term originally was applied to communications service providers, referring to a management system that controlled telephone and computer networks. The term has since been applied to the business world in general to mean a system that supports an organization's network operations.

Packet: A piece of a message transmitted over a packet-switching network. One of the key features of a packet is that it contains the destination address in addition to the data. In IP networks, packets are often called datagrams.

Packet switching: Protocols in which messages are divided into packets before they are sent. Each packet is then transmitted individually and can even follow different routes to its destination. Once all the packets forming a message arrive at the destination, the packets are recompiled into the original message. Most modern Wide Area Network (WAN) protocols, including TCP/IP, X.25, and Frame Relay, are based on packet-switching technologies. In contrast, normal telephone service is based on a circuit-switching technology, in which a dedicated line is allocated for transmission between two parties. Circuit-switching is ideal when data must be transmitted quickly and must arrive in the same order in which the data is sent. This is the case with most real-time data, such as live audio and video. Packet switching is more efficient and robust for data that can withstand some delays in transmission, such as e-mail messages and Web pages. ATM attempts to combine the best of both worlds—the guaranteed delivery of circuit-switched networks and the robustness and efficiency of packet-switching networks.

SMS: Systems Management Server, a set of tools from Microsoft that assists in managing PCs connected to a local-area network (LAN). SMS enables a network administrator to create an inventory of all the hardware and software on the network and to store it in an SMS database. Using this database, SMS can then perform software distribution and installation over the LAN. SMS also enables a network administrator to perform diagnostic tests on PCs attached to the LAN.

SONET: Synchronous Optical Network. SONET is a standard for connecting fiber-optic transmission systems. SONET was proposed by Bellcore in the middle 1980s and is now an ANSI standard. SONET defines interface standards at the physical layer (Layer 1) of the OSI seven-layer model. The SONET standard defines a hierarchy of interface rates that allow data streams at different rates to be multiplexed. SONET establishes Optical Carrier (OC) levels from 51.8 Mbps (about the same as a T-3 line) to 2.48 Gbps. Prior rate standards used by different countries specified rates that were not compatible for multiplexing. With the implementation of SONET, communication carriers throughout the world can interconnect their existing digital carrier and fiber optic systems.

TARP: Terminal identifier Address Resolution Protocol

TCP: Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent.

According to the present disclosure, a synchronous optical network (SONET) system having multi-hierarchal network service access point (NSAP) addressing is provided. The system comprises a plurality of electrically linked network elements (NEs), and a first level routing area and a second level routing area that each comprise at least one NE. The first level routing area and the second level routing area are based on a predetermined prioritization of the NEs as first level NEs and second level NEs, and have a first level routing and have a second level routing for the NSAP addresses, respectively. Each of the areas is capable of having at least 151 NEs. The NEs comprise devices having respective NSAP addresses and at least one of the NEs is a network controller that controls the SONET. Each NSAP address includes a Routing Domain field and an Area field filled with information indicative of a respective Internet Protocol (IP) address.

Also according to the present disclosure, a method of generating a multi-hierarchal synchronous optical network (SONET) having network service access point (NSAP) addresses is provided. The method comprises electrically linking a plurality of network elements (NEs) to form a plurality of areas that comprise at least one NE, and generating a prioritization for the NSAP addresses as having a first level routing and as having a second level routing and defining the areas as a first level routing area and a second level routing area, respectively, based on a predetermined prioritization of the NEs as first level NEs and second level NEs, respectively. The NEs comprise devices having respective NSAP addresses and at least one of the NEs is a network controller that controls the SONET, and each of the areas is capable of having at least 151 NEs. Each NSAP address includes a Routing Domain field and an Area field filled with information indicative of a respective Internet Protocol (IP) address.

Further, according to the present disclosure, a multi-hierarchal synchronous optical network (SONET) network is provided. The network comprises a plurality of network elements (NEs) electrically linked, and a first level routing area and a second level routing area that each comprise at least one NE. The NEs comprise devices having respective network service access point (NSAP) addresses and at least one of the NEs is a network controller that controls the SONET. The first level routing area and the second level routing area are based on a predetermined prioritization of the NEs as first level NEs and second level NEs, and have a first level routing and have a second level routing for the NSAP addresses, respectively, and each of the areas is capable of having at least 151 Nes. The first level routing provides intra-area connectivity and communication between respective first level and second level NEs within each one of the areas, and the second level routing provides connectivity and communication between second level NEs in the areas and between second level NEs within each one of the areas. The NE that controls the SONET is a second level NE, and at least one other of the second level NEs is a backup controller. Each NSAP address includes a Routing Domain field and an Area field filled with information indicative of a respective Internet Protocol (IP) address.

The above features, and other features and advantages of the present disclosure are readily apparent from the following detailed descriptions thereof when taken in connection with the accompanying drawings.

With reference to the Figures, the preferred embodiments of the present disclosure will now be described in detail. The present disclosure may be advantageously implemented in connection with a system having Synchronous Optical Network SONET addresses (illustrated in connection with FIGS. 1 and 2). The present disclosure is generally directed to a system and method for subdividing and reassigning fields within the existing NSAP addresses by changing the NSAP addresses and providing a hierarchical addressing scheme. The present disclosure is generally implemented in connection with a SONET. In one example, the system and method of the present disclosure may be implemented in connection with a telecommunications SONET. However, the present disclosure may be implemented in connection with any appropriate network to meet the design criteria of a particular application.

In the NSAP, the AFI, IDI, DFI, RSVD (or RES) and S (or SEL) fields are generally fixed (i.e., not subject to change). The ORG field (i.e., organization identifier) in the NSAP is generally assigned to an enterprise by American National Standards Institute (ANSI). As such, the enterprise may subdivide the three (3) octets of the ORG field. Further, the enterprise may reassign the octets in the RDI and Area fields.

Referring to FIGS. 3a and 3b, diagrams illustrating NSAP addressing 100 according to the present disclosure are shown. The size of the RDI (or RD) field is two bytes. As such, there may be 2^16 (i.e., 65,536) unique areas within the RDI field. When a unique RDI is predetermined (i.e., assigned, chosen, obtained, etc.) by an enterprise, the RDI may be subdivided within regions (e.g., business sub-units, geographical regions or areas, and the like). The RDI field may be filled with the first two octets of a respective Internet protocol (IP) address. The size of the Area field is two bytes. The Area field may be filled with the last two octets of the respective Internet protocol (IP) address. The systematic NSAP addressing is shown in FIG. 3a and details of the address byte positioning (e.g., location, placement, assignment, integration, combination, arrangement, plan, scheme, etc.) in the RDI field and in the Area field are shown in FIG. 3b.

Referring to FIG. 4, an example of an assignment 200 of an NSAP related to four devices according to the present disclosure is shown. SONET NSAP addressing 100 of the present disclosure (as described in connection with FIGS. 3a and 3b) may be implemented in connection with assignment 200. In the example NSAP addressing 200, column 202 generally describes the devices (e.g., network elements, NEs) Dev1, Dev2, Dev3 and Dev4 comprising the system that is implemented in connection with the present disclosure. Column 204 includes example values for the respective IP addresses for the primary controller Dev1 and the backup controller Dev2. Column 206 may provide example values for hexadecimal representations of respective RDI and Area fields for the devices Dev1, Dev2, Dev3 and Dev4. Column 208 may provide example values for MAC representations of respective devices Dev1, Dev2, Dev3 and Dev4. Column 210 may provide example values for assignable NSAP RDI, Area and System fields for respective devices Dev1, Dev2, Dev3 and Dev4.

All IP addresses within a given communication network (e.g., networks such as CODCN, COi and CONet) space are generally managed by respective enterprise Information Technology (IT) and may be guaranteed by IT to be unique. The respective Internet protocol (IP) addresses may be predetermined (e.g., assigned, chosen, etc.) such that a unique NSAP is generated. Gateway Network Elements have an IP address to communicate with a respective Enhanced Message Service (EMS). As such, an IP address is generated for the respective NEs in a network (or system). The four Octets from the IP Address will exactly fit into the RDI and the Area fields in the NSAP. Mapping 200 is generally implemented via instructions in the primary and secondary SONET system controllers (e.g., the primary controller Dev1 and the backup controller Dev2).

Referring to FIG. 5, a diagram illustrating a system 300 is shown. System 300 is generally implemented as a SONET system. SONET NSAP addressing 100 and assignment 200 of the present disclosure (as described in connection with FIGS. 3a, 3b, and 4, respectively) may be implemented in connection with system 300. In one example, system 300 generally comprises an Area A (e.g., area 302), Area B (e.g., area 304), and an Area C (e.g., area 306). However, system 300 may be implemented as an area having any appropriate number of sub-areas to meet the design criteria of a particular application. In one example, areas 302, 304 and 306 may be implemented as geographic areas. In another example, areas 302, 304 and 306 may be implemented as units or sub-units (i.e., sub-areas) within a business enterprise. However, the areas and sub-areas may be implemented as any appropriate structure to meet the design criteria of a particular application.

Areas 302, 304 and 306 generally comprise a two-level Information System (IS) hierarchy. Each IS comprising areas 302, 304 and 306 generally includes a central office (CO). The ISs generally comprise at least one controller (e.g., NE, microcontroller, processor, computer, devices such as Dev1 and Dev2, etc.) and at least one memory that have stored, thereon, at least one instruction set (e.g., program steps) to perform the method of the present disclosure. Area 302 may have a first level IS 310 and a second level IS 312. IS 310 and IS 312 may be electrically coupled via a link 314 (e.g., interconnection, cable, electrical communication, fiber optic cable, and the like).

The controllers preferably comprise a programmable microprocessor in electrical communication with (i.e., electrically coupled to) various computer readable storage media via at least one data and control bus. The computer readable storage media may include any of a number of devices such as read only memory (ROM), random access memory (RAM), and non-volatile (keep-alive) random access memory (NVRAM).

The various types of computer-readable storage media generally provide short-term and long-term storage of data (e.g., at least one lookup table, LUT, at least one operation control routine, at least one mathematical model for control, etc.) used by the controller to control the NSAP addressing implemented in connection with the present disclosure. The computer-readable storage media may be implemented by any of a number of known physical devices capable of storing data representing instructions executable by the microprocessor. Such devices may include PROM, EPROM, EEPROM, flash memory, and the like in addition to various magnetic, optical, and combination media capable of temporary and permanent data storage.

Area 304 may have a first level IS 320, a first second level IS 322, and a second level IS 324. IS 320 and IS 322 may be electrically coupled via a link 326. IS 320 and IS 324 may be electrically coupled via a link 328. IS 322 and IS 324 may be electrically coupled via a link 330.

Area 306 may have a first level IS 340 and a second level IS 342. IS 310 and IS 312 may be electrically coupled via a link 344. Second level IS 312 and second level IS 322 may be electrically coupled via a local data country code (LDCC) link 350. Second level IS 324 and second level IS 342 may be electrically coupled via a LDCC link 352. Links 314, 326, 328, and 344 generally provide first level connectivity and communication between respective first level and second level NEs within an area (e.g., intra-area, between sub-areas, etc.). Links 330, 350 and 352 generally provide second level connectivity and communication between areas 302, 304 and 306 (i.e., between the Areas A, B and C) and between second level NEs within an area (e.g., between NEs 322 and 324).

In one example implementation of a SONET, the following address spaces may be used:
10.48.0.0/16
10.49.0.0/16
10.50.0.0/16
10.51.0.0/16
10.52.0.0/16
10.53.0.0/16
10.54.0.0/16
10.55.0.0/16

In another example implementation of a SONET, the following address spaces may be used:
172.16.0.0/16-172.24.0.0/16

In yet another example implementation of a SONET, the following address spaces may be used:
10.79.0.0/16
10.94.0.0/16
10.113.0.0/16
10.131.0.0/16
10.139.0.0/16
10.151.0.0/16
10.159.0.0/16
10.191.0.0/16
10.196.0.0/16
10.211.0.0/16
10.219.0.0/16
144.61.0.0/16
144.149.0.0/16
144.159.0.0/16
155.243.64.0/20

For the example SONET address spaces listed above, overlap between the address space is absent. The system and method for subdividing and reassigning fields within the existing NASP addresses by changing the NSAP addresses and providing a hierarchical addressing scheme of the present disclosure generally provides 255 (i.e., $2^8-1$) Level 2 addresses per CO. In contrast, conventional approaches to NSAP addressing only provide 50 to 150 addresses per CO. As such, the present disclosure generally provides for current and future deployments of NSAPs. The system and method for subdividing and reassigning fields within the existing NASP addresses of the present disclosure is in addition to the entire suite of Level 1 addresses affordable by the MAC address.

In one example implementation of the present disclosure (e.g., addressing 100 and assignment 200 as implemented in connection with system 300), for a ring with four devices the primary controller may be located on Dev1 and the backup controller is generally in Dev2. The IP address for the controllers originate from (e.g., are generated at) the Central Office where the controllers are placed (i.e., located, installed, implemented, etc.). However, the respective NSAPs originate from the respective CO related to the controllers. For devices that do not use controllers, a device that performs as a gateway and the like is generally implemented.

The first part of the NSAP is the same across the enterprise (e.g., corporation, firm, company, etc.) where the present disclosure is implemented and may be as listed in the following fields.
The AFI is 0x39
The IDI and IDI Pad are 0x840 and 0xf, respectively.
The DFI is 0x80
The enterprise Org ID is 0x113740, and may be reused
The Reserved bits are 0x0000.
Combining the fields yields 0x39840f801137400000

All of the devices on the ring generally have the same RDI and Area fields. The MAC address fields generally have different values associated with the different NEs.

The present disclosure provides for splitting the IP address domains into several smaller sub-domains (e.g., hierarchical addressing). As such, some NEs (e.g., NEs 312, 322, 324 and 342) generally serve (i.e., perform) as higher level (e.g., Second level) routers to route traffic between the two areas (e.g., between area 302 and area 304, and between area 304 and area 306). That is, at least two of NEs 312, 322, 324 and 342 may be implemented as, primary and backup controllers (e.g., the devices Dev1 and Dev2), respectively.

The SONET equipment implemented in connection with the present disclosure (e.g., NEs 312, 322, 324 and 342) generally sets (e.g., establishes, chooses, predetermines, etc.) the addresses for the respective routing area. NEs 312, 322, 324 and 342 generally perform second level routing in connection with predetermined addressing. As such, the routing area sizes can be maintained within the desired limits without significant reconfiguration of exiting management configurations.

The present disclosure may be implemented by performing at least one of the following operations (e.g., steps, blocks, routines, etc.), for example, via the controllers (e.g., devices, NEs, etc.) implemented as the primary and backup controllers. In one example, the following steps may be performed serially. However, the following steps may be performed in any appropriate sequence to meet the design criteria of a particular application.

(i). Obtaining the portion of the respective IP address for the enterprise where the present disclosure is implemented (e.g., the ORG id field value) from the appropriate assigning authority (e.g., ANSI). Obtaining a unique ORG id field value may eliminate addressing coordination issues with other business entities, enterprises, and the like, and may avoid, reduce or prevent future addressing conflicts.

(ii). Managing area addresses (e.g., generating area addresses in response to predetermined criteria such as server type) to provide consistent implementation of existing and future routing areas (e.g., paths, links, interconnections, electrical communications, etc.).

(iii). Generating a prioritization for the address assignment process (e.g., designating NEs as having first level area routing and as having second level area routing based on a predetermined prioritization of the NEs).

(iv). Generating at least one span of control map (e.g., the interconnections illustrated in connection with system 300) that includes transitions across routing areas for determining (or defining) second level (i.e., high level) routing areas.

(v). In one example, rearranging the at least one span of control to conform to geographic routing areas.

(vi). Converting pre-existing geography-based area addresses to the addressing assignments of the present disclosure within a predetermined duration (e.g., a time predetermined to avoid prolonged management or service disruption).

(vii). Establishing (generating) second level routing areas that reduce first level (i.e., low level) routing area sizes to a minimum (i.e., minimizing first level routing area sizes by optimizing second level routing areas).

(viii). Consolidating SONET nodes (e.g., NEs) to reduce the total number of nodes used in the network, while substantially simultaneously configuring routing areas to minimize first level routing area sizes.

While embodiments of the present disclosure have been illustrated and described, it is not intended that these embodiments illustrate and describe all possible forms of the present disclosure. Rather, the words used in the specification are words of description rather than limitation, and it is understood that various changes may be made without departing from the spirit and scope of the present disclosure.

What is claimed is:

1. A synchronous optical network (SONET) system having multi-hierarchal network service access point (NSAP) addressing, the system comprising:
a plurality of network elements (NEs) electrically linked, wherein the NEs comprise devices having respective NSAP addresses and at least one of the NEs is a network controller that controls the SONET; and
a first level routing area and a second level routing area that each comprise at least one NE, wherein the first level routing area and the second level routing area are based on a predetermined prioritization of the NEs as first level NEs and second level NEs, and having a first level routing and having a second level routing for the NSAP addresses, respectively;
wherein each NSAP address includes a Routing Domain field and an Area field filled with information indicative of a respective Internet Protocol (IP) address.

2. The system of claim 1 wherein:
the first level routing provides intra-area connectivity and communication between respective first level and second level NEs within each one of the areas, and the second level routing provides connectivity and communication between second level NEs in the areas and between second level NEs within each one of the areas.

3. The system of claim 1 wherein:
the NE that controls the SONET is a second level NE, and at least one other of the second level NEs is a backup controller.

4. The system of claim 1 further comprising:
at least one span of control map for defining the second level routing areas that includes transitions across the first and second level routing areas, and at least one of the span of control maps conforms to geographic routing areas.

5. The system of claim 1 wherein:
a unique ORG id field value is obtained from an appropriate assigning authority, and the ORG id field value is assigned in the respective NSAP addresses.

6. The system of claim 1 wherein:
the NSAP addresses are generated in response to at least one predetermined criteria including server type.

7. A method of generating a multi-hierarchal synchronous optical network (SONET) having network service access point (NSAP) addresses, the method comprising:
electrically linking a plurality of network elements (NEs) to form a plurality of areas that comprise at least one NE, wherein the NEs comprise devices having respective NSAP addresses and at least one of the NEs is a network controller that controls the SONET; and
generating a prioritization for the NSAP addresses as having a first level routing and as having a second level routing and defining the areas as a first level routing area and a second level routing area, respectively, based on a predetermined prioritization of the NEs as first level NEs and second level NEs, respectively;
wherein each NSAP address includes a Routing Domain field and an Area field filled with information indicative of a respective Internet Protocol (IP) address.

8. The method of claim 7 wherein:
the first level routing provides intra-area connectivity and communication between respective first level and second level NEs within each one of the areas, and the second level routing provides connectivity and communication between second level NEs in the areas and between second level NEs within each one of the areas.

9. The method of claim 7 wherein:
the NE that controls the SONET is a second level NE, and at least one other of the second level NEs is a backup controller.

10. The method of claim 7 further comprising:
generating at least one span of control map for defining the second level routing areas that includes transitions across the first and second level routing areas, and at least one of the span of control maps conforms to geographic routing areas.

11. The method of claim 7 further comprising:
consolidating NEs to reduce the total number of NEs in the SONET.

12. The method of claim 7 further comprising:
obtaining a unique ORG id field value from an appropriate assigning authority, and assigning the ORG id field value in the respective NSAP addresses.

13. The method of claim 7 further comprising:
generating the NSAP addresses in response to at least one predetermined criteria including server type.

14. A multi-hierarchal synchronous optical network (SONET) network, the network comprising:
a plurality of network elements (NEs) electrically linked, wherein the NEs comprise devices having respective network service access point (NSAP) addresses and at least one of the NEs is a network controller that controls the SONET; and
a first level routing area and a second level routing area that each comprise at least one NE, wherein the first level routing area and the second level routing area are based on a predetermined prioritization of the NEs as first level NEs and second level NEs, and having a first level routing and having a second level routing for the NSAP addresses, respectively, the first level routing provides intra-area connectivity and communication between respective first level and second level NEs within each one of the areas, and the second level routing provides connectivity and communication between second level NEs in the areas and between second level NEs within each one of the areas, and the NE that controls the SONET is a second level NE, and at least one other of the second level NEs is a backup controller;
wherein each NSAP address includes a Routing Domain field and an Area field filled with information indicative of a respective Internet Protocol (IP) address.

* * * * *